Figure 10:
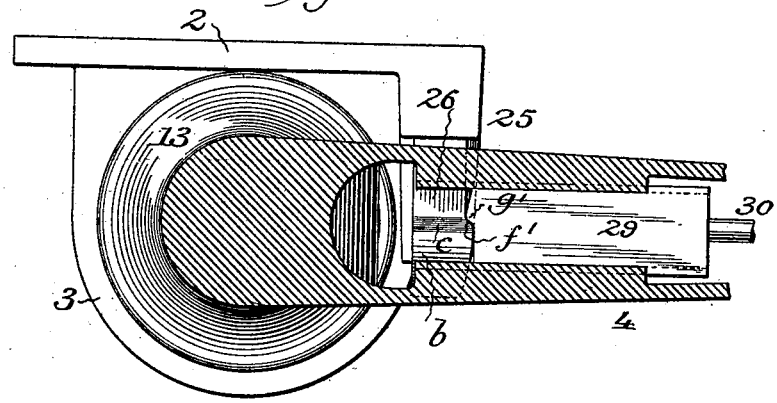

No. 646,814. Patented Apr. 3, 1900.
P. G. EMERY & W. WISHART.
BRAKE ACTUATING MECHANISM.
(Application filed Jan. 4, 1900.)
(No Model.) 4 Sheets—Sheet 1.
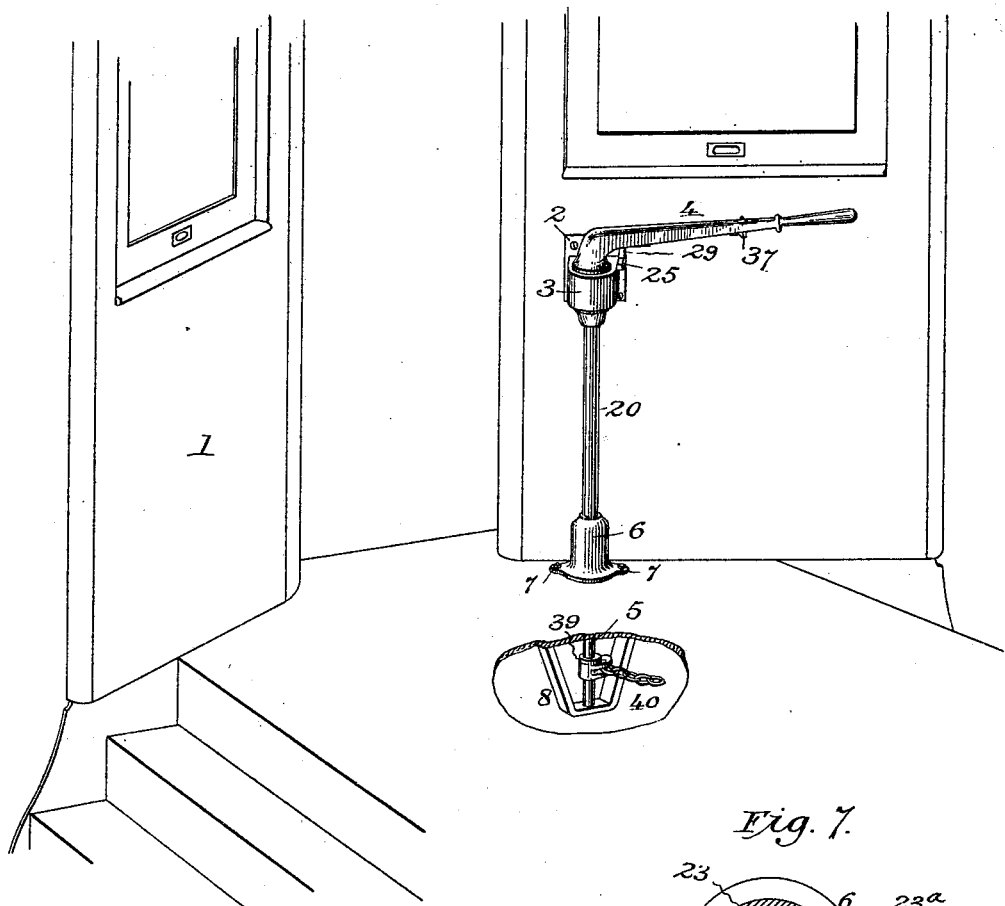
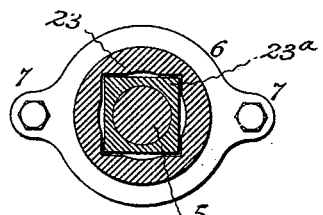
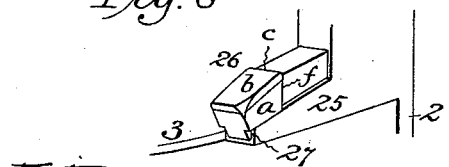
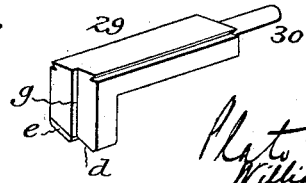
Witnesses:
Sidney P. Hollingsworth
C. B. Bull
Inventors
Plato G. Emery
William Wishart
THE NORRIS PETERS CO., PHOTO-LITHO., WASHINGTON, D. C.

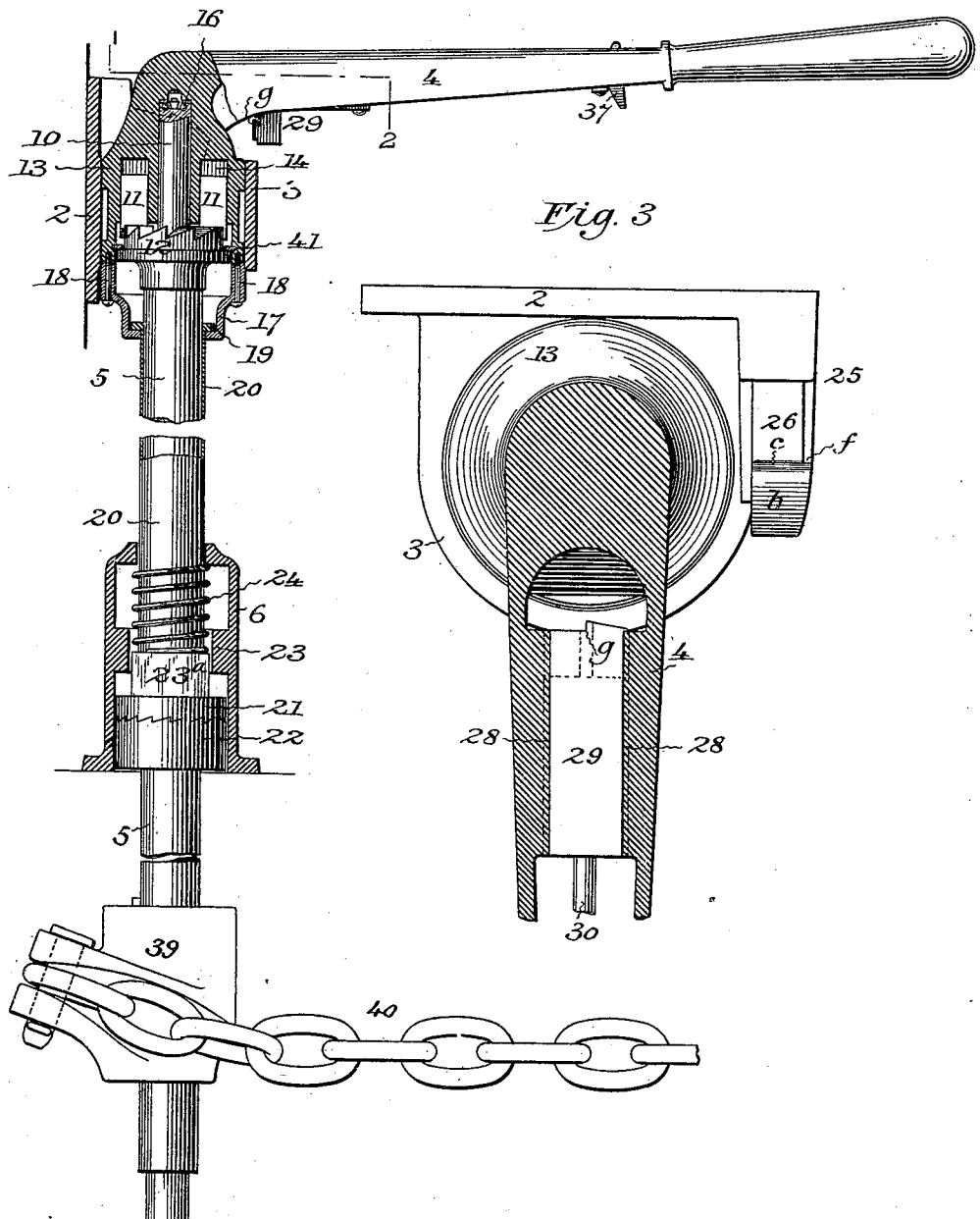

No. 646,814. Patented Apr. 3, 1900.
P. G. EMERY & W. WISHART.
BRAKE ACTUATING MECHANISM.
(Application filed Jan. 4, 1900.)
(No Model.) 4 Sheets—Sheet 3.
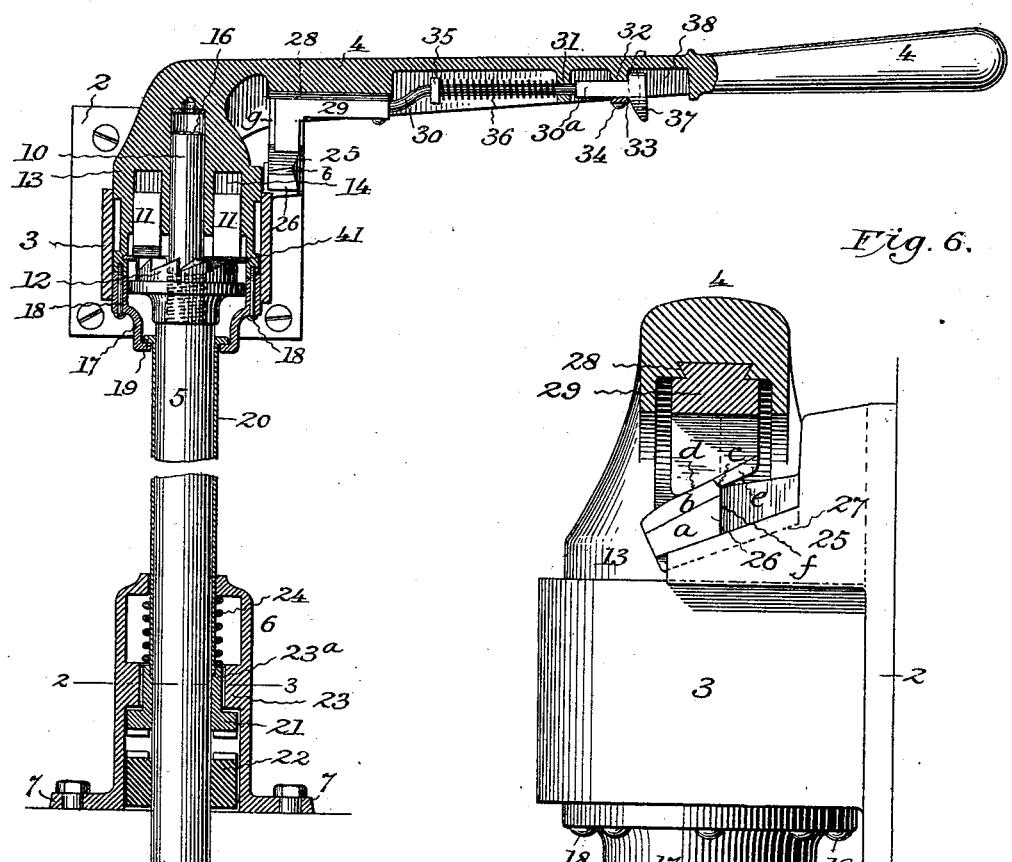
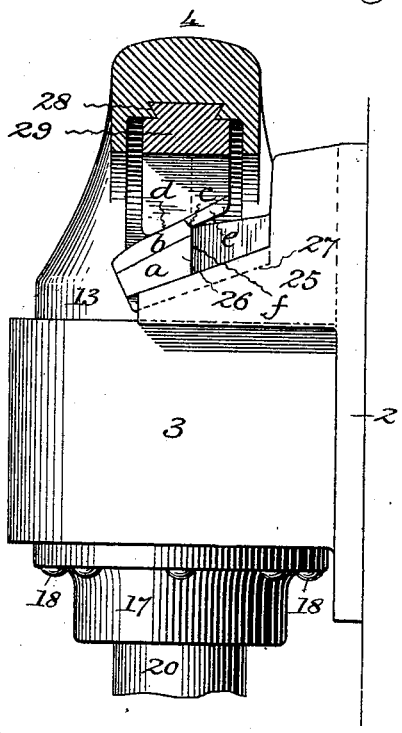
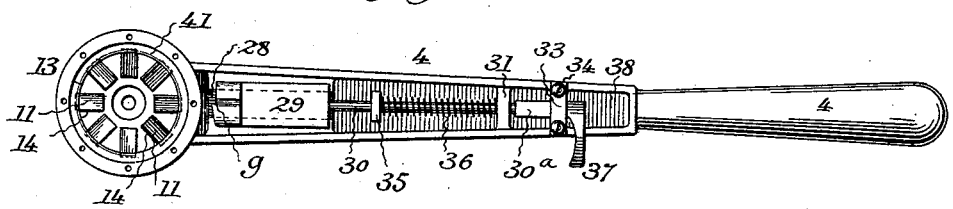

No. 646,814. Patented Apr. 3, 1900.
P. G. EMERY & W. WISHART.
BRAKE ACTUATING MECHANISM.
(Application filed Jan. 4, 1900.)

(No Model.) 4 Sheets—Sheet 4.

UNITED STATES PATENT OFFICE.

PLATO G. EMERY AND WILLIAM WISHART, OF CHICAGO, ILLINOIS, ASSIGNORS TO THE ADAMS & WESTLAKE COMPANY, OF ILLINOIS.

BRAKE-ACTUATING MECHANISM.

SPECIFICATION forming part of Letters Patent No. 646,814, dated April 3, 1900.

Application filed January 4, 1900. Serial No. 372. (No model.)

*To all whom it may concern:*

Be it known that we, PLATO G. EMERY and WILLIAM WISHART, citizens of the United States, residing at Chicago, in the county of Cook and State of Illinois, have invented a new and useful Improvement in Brake-Actuating Mechanisms, of which the following is a specification, reference being had to the accompanying drawings and to the numerals and letters of reference marked thereon.

Our invention relates to a brake-actuating mechanism for installment more especially in the vestibules of railway-coaches, but applicable also upon motor street-cars or other cars, and has for its object to furnish a device whereby the brakeman, motorman, or manipulator may set the brake rapidly and with great effect and which at the same time shall occupy but little space and may be used with safety to the operator. A special feature of advantage in this device is that it enables the brakeman to release the brakes at one operation of the handle or lever, there being no exposed ratchets or pawls adjacent to the floor requiring operation before such release is effected. In order to accomplish this result, two sets of ratchet mechanism, an upper and a lower, are used, the lower set being employed to hold the brake-staff from reversing while the handle is being operated, the handle-head being so connected with the lower ratchet mechanism that when the handle is thrown to or back the ratchets of both sets are disengaged, allowing the brakes to be released without the necessity of liberating by the foot of the operator a lower ratchet mechanism, as generally heretofore practiced. Means are provided for holding the handle back or out of the passage-way after the brakes have been released, for permitting the setting of the brakes and holding them set when the car is in the cleaning-yard or on a side track or elsewhere, and other novel features employed, the functions of which will hereinafter appear.

The nature of the invention and its uses will be more fully described in connection with the accompanying drawings, in which—

Figure 11:
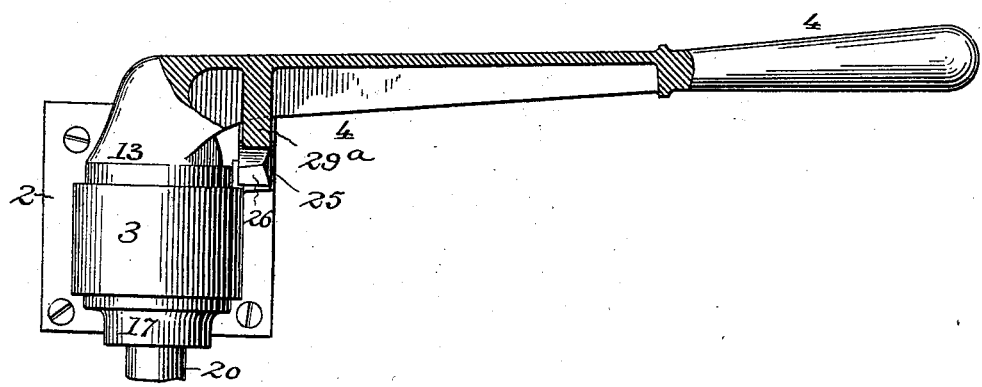

Figure 1 is an interior view of the vestibule of a railway-coach of approved construction, showing the brake-handle, staff, brake-chain, &c., the handle being thrown back against a panel of the vestibule and clear of the passage-way. Fig. 2 is an enlarged view, chiefly in section, illustrating the brake-handle, staff, and adjuncts, the support of the staff within the vestibule, and the attachment of the brake-chain, the upper and lower ratchet mechanisms being in engagement. Fig. 3 is a view, partly in horizontal section, through the line 1 2 of Fig. 2 and still further enlarged. Fig. 4 is a view showing the brake-handle mainly in section, as also the support of the brake-staff within the vestibule, the ratchet mechanisms of the upper and lower sets being disengaged. Fig. 5 is an inverted plan view of the brake-handle and its appurtenances. Fig. 6 is a view, partly in section, of a detail of the handle and parts coöperating therewith, said view being shown enlarged. Fig. 7 is a transverse section on the line 2 3 of Fig. 4. Figs. 8 and 9 are details hereinafter described. Figs. 10 and 11 are modifications.

Similar numerals and letters of reference indicate similar parts in the respective figures.

1 represents a portion of the vestibule of a railway-coach of modern type. As here shown, the vestibule is provided with two panels, one on each side of the passage-way. To the right-hand panel is attached a plate 2, having formed integrally therewith the bearing 3, constituting the upper support of the head or pivotal part of the brake-handle 4. The brake-staff 5 is supported at the floor of the vestibule by a housing 6, secured by lugs 7 to the floor, as shown in Figs. 1 and 4, and by a lower bearing 8. The brake-handle 4 is bored to fit over the reduced portion 10 of the brake-staff and is furnished with a series of gravity-pawls 11, as seen in Figs. 2, 4, and 5, and which engage, as hereinafter explained, with the ratchet 12, which is screwed upon the brake-staff. The handle itself, as here shown, in its general exterior appearance is of an approved form now in use in railway-coaches, but may be varied in shape and size to adapt it to motor-car or other practice and in accordance with the space provided. The head or pivotal portion of the handle is in the form of a socket or enlarged boss 13, and within this socket or boss is provided the series of pockets 14, radiating from the center, in which the gravity-pawls 11 are placed. The pockets may be formed within the socket or boss casting itself, or a separate casting comprising the pockets may be secured within the boss. The gravity-pawl arrangement here shown is substantially that described in Letters Patent No. 576,043, granted to Plato G. Emery January 26, 1897, and, if desired, in order to reduce friction hardened-steel balls 16, Figs. 2 and 4, or as in the said Patent No. 576,043, may be employed. The ratchet-wheel and gravity-pawl arrangement here shown is not, however, essential to our present invention, nor are the ball-bearings, although both have been found desirable. Secured to the under edge of the head portion of the handle 4 is a cylindrical cap 17, the attachment being made by means of screws 18, the function of said cap being to close the under part of the head of the handle and also to support the flange or ring 19 of the tube 20, the purpose of which will be hereinafter described.

Within the housing 6 are inclosed the lower pair of ratchets 21 and 22, the under ratchet 22 being secured by a shrink fit to the brake-staff 5, while the upper ratchet 21 is provided with a square collar $23^a$, to which is attached by a screw-thread the tube 20. Midway of the length of the housing 6 is an internal projection 23, having a square opening into which is slidably fitted the collar $23^a$ of the ratchet 21. (See Figs. 2, 4, and 7.) Surrounding the tube 20 and confined between the top of the square collar $23^a$ and the roof of the housing 6 is a coiled spring 24, the office of which is to normally cause the engagement of the upper and lower ratchets 21 and 22, as seen at Fig. 2, the tube 20 being adapted to slide upon the brake-staff 5 as required in the movement and action of the ratchet 21. In order to permit the sliding motion of the tube 20, sufficient space is provided within the cap 17, as will be understood.

Formed with the plate 2 and the bearing 3 is a projection 25, (see particularly Fig. 6,) to which is suitably attached an incline 26, in this case fitted within a groove 27 and soldered or otherwise secured to the projection 25. The joint therefore, while permanent, may be broken, if desired, for the removal of the incline 26 and the substitution of a new one. The incline 26 itself consists of two members $a$ and $b$, the lower one, $a$, being of composition, while the upper or wearing member $b$ is of hardened steel, the two members being suitably united. The steel member $b$ extends slightly above the member $a$, producing a shoulder $c$, as clearly shown in Fig. 6.

Mounted within a dovetail groove 28, formed in the handle 4, is a slide 29, having an inclined face $d$, furnished with a steel wearing-surface $e$, said slide 29 being adapted to move longitudinally within the handle 4, as will be understood by reference to Figs. 3, 4, 5, and 6. Attached to the slide 29 is a rod 30, having bearings 31 and 32 in the handle, the bearing 32 having a cap 33 secured to it by means of screws 34, the cap supporting the outer end of the rod 30. The said rod is provided with a fixed collar 35, between which and the bearing 31 is placed a coiled spring 36, the tendency of which is to force the slide 29 in engagement with the incline 26. The outer end of the rod 30 is squared, as at $30^a$, and furnished with a thumb-hold 37, adapted to slide within a cavity 38, formed in the handle 4, Figs. 4 and 5.

The lower end of the brake-staff 5 is provided with a worm 39 of any approved construction, to which is secured the brake-chain 40.

Other features of the invention, together with a statement of their novel functions, will be given in connection with the following description of the general operation.

When the operator pulls the handle 4 toward him, and thus disengages the inclined face $d$ of the slide 29 from the member $b$ of the incline 26, the pawls 11, the downward movement of which (when the handle is in elevated position) is limited by the cut spring-ring 41, engage the ratchet 12, and at each operative movement of the handle the brake-staff 5 is given a partial revolution. At the same time the coincident partial revolution of the lower ratchet 22 causes the upper ratchet 21 (fixed by the square collar $23^a$ against rotation) to ride up out of engagement, carrying up with it the tube 20 against the force of the spring 24. The handle 4 having been moved the requisite distance, the upper ratchet 21 is forced by the spring 24 into engagement with the ratchet 22, thus locking the brake-staff 5 against reverse movement in the same manner that the brake-staff has generally heretofore been locked against such reverse action by an exposed pawl-and-ratchet mechanism operated by the foot of the brakeman. The rotation of the brake-staff, it will be understood, through the medium of the worm 39, winds up the chain 40, thus applying the brakes. The necessary braking action having been effected, and it is desired to release the brakes, all required to be done is that the operator shall give the handle 4 a back thrust, causing the steel wearing-surface $e$ of the slide 29 to ride up upon the steel member $b$ of the incline 26 until the forward end of the steel wearing-surface $e$ is brought behind the shoulder $c$ of the member $b$ of the incline 26, when the handle will drop, thus locking it in readiness for the next braking action. It will be seen that the longitudinal movement of the head of the handle 4, produced by the riding up of the handle, will, through the medium of the ring 41, lift the gravity-pawls 11 above the teeth of the ratchet 12 and that at the same time, by reason of the connection between the cap 17 and the tube 20, the ratchet 21, connected with said tube, will be lifted up out of engagement with the ratchet 22, thus leaving the brake-staff 5 free, under the tension of the chain 40, to rotate in an opposite direction and so release the brakes. The square collar 23ª of the upper ratchet 21 of the lower brake mechanism, fitting within the squared opening in the internal projection 23 of the housing 6, keeps the ratchet 21 and its attached tube 20 from revolving, while both are capable of vertical movement, the tube, as before stated, being given enough space within the cap 17 to permit of such movement. While a tube is here shown as the means of connecting the upper ratchet of the lower set with the handle-head, other means of connection might be employed, such as rods or the like; but the tube has been adopted as the most convenient and neatest mode of connection which has suggested itself to us.

A further and important detail of our invention will now be described. It will be seen (see particularly Fig. 8) that the incline 26 is not only provided with a top shoulder $c$, already described, but also with an outer side shoulder $f$, while the steel wearing-surface $e$ of the slide 29 overhangs, so as to form an inner side shoulder $g$, Fig. 9. The joint function of the two last-named shoulders is as follows: When it is desired that the brake shall remain set and the handle 4 pushed back and locked against releasement, the thumb-hold 37 is forced back, so as to draw the slide 29 outwardly past the incline 26 in order to be freed from it and so as not to ride up thereon, when on pushing the handle home the side shoulder $g$ of the slide will pass behind the side shoulder $f$ of the incline 26, and, the thumb-hold being released, the two shoulders will automatically engage, thus locking the handle 4 in position in line with the partition of the vestibule. From this position it can only be released by again forcing the thumb-hold 37 back, so as to free the shoulders $g$ and $f$ from each other, when the handle may be pulled out. Upon the release of the thumb-hold 37 the slide is automatically pushed out in front of the incline by the action of the spring 36, whereupon the handle, being pushed in, may ride up, as hereinbefore described, after the next braking action, and thus release brakes, as described. It will be seen, therefore, that the handle may be locked while the brakes are set, as in the railway cleaning-yard or on a side track, and that at the same time the handle is caused to lie in such locked condition closely to the wall or panel and not across the passage-way of the vestibule.

In Fig. 10 a construction is shown by which the shoulders may be automatically disengaged when the handle is pulled out. In this figure the shoulders here lettered $f'$ and $g'$ are beveled, so that there is no necessity of forcing the thumb-hold 37 back in order to free the shoulders from each other. In Fig. 11 the handle 4 is shown without the slide 29 and its appendages. The incline 26 is attached to the bearing 3, as hereinbefore described; but instead of the inclined face $d$ of the slide 29 (see Fig. 6) there is shown in Fig. 11 a corresponding incline 29ª, forming a part of the handle. The bolt 29 is not necessary in street-car use, and the modification shown in Fig. 11 is intended to cover the device as applied to a street-car.

We do not restrict ourselves to exact details hereinbefore described, it being obvious that minor and unimportant changes may be made in construction and arrangement without a departure from the main features of this invention. Such minor and unimportant changes may suggest themselves to skilled mechanics without the exercise of inventive faculty, and therefore such are considered to be fully within the scope of our invention. For example, modifications in form and size may be made to adapt this invention for use in street-car vestibules, other ratchet mechanisms may be used within the head of the handle, other connections between the handle and the lower ratchet set employed, &c. The term "ratchet mechanism" as herein applied to that connected with the handle-head and also that at the lower part of the brake-staff is intended to cover any suitable appliance capable of producing the same effects. Thus any approved frictional or other contrivance might be substituted in connection with the handle and any other approved retaining mechanism for the ratchet device here described for holding the brake-staff as it is revolved.

Having thus described our invention, we claim—

1. In a brake-actuating mechanism, the combination of a brake-handle, a brake-staff, an upper ratchet mechanism connecting the head of the brake-handle with the head of the brake-staff, a lower retaining mechanism comprising a ratchet member secured to the brake-staff, and a ratchet member capable bodily of vertical sliding movement, means for connecting the brake-handle with the sliding member of the lower retaining mechanism, and means for disengaging the upper and lower sets of ratchet mechanism, substantially as set forth.

2. In a brake-actuating mechanism, the combination of a brake-handle, a brake-staff, an upper ratchet mechanism connecting the handle with the head of the brake-staff, a lower retaining mechanism comprising an under ratchet secured to the brake-staff, and an upper ratchet adapted to slide upon the brake-staff, means for connecting the upper ratchet of said retaining mechanism with the brake-handle, and means for releasing the upper and lower ratchet mechanisms, substantially as set forth.

3. In a brake-actuating mechanism, a brake-handle, a brake-staff, an upper ratchet mechanism connecting the brake-handle with the head of the brake-staff, a lower retaining mechanism comprising an under ratchet secured to the brake-staff and an upper ratchet adapted to slide upon the brake-staff but held against rotation, a tube adapted to slide upon the brake-staff and connecting said upper ratchet of the lower retaining mechanism with the brake-handle, means for automatically effecting the engagement of the upper and under ratchets of the retaining mechanism, and means for disengaging the upper and lower sets of ratchet mechanism by one stroke of the handle, whereby the brakes may be readily released, substantially as set forth.

4. In a brake-actuating mechanism, the combination of a brake-handle, a brake-staff, means for engagement between the head of the handle and the head of the brake-staff, a bearing for the brake-staff inclosing a retaining mechanism comprising an under ratchet member secured to the brake-staff and an upper ratchet member slidably mounted upon the brake-staff but held against rotation thereon, means for connecting the said sliding upper ratchet member with the brake-handle, means within the said bearing tending to keep in engagement the said upper and under ratchet members, and means for raising the handle-head by an inward movement of the handle, whereby the handle-head is released from engagment with the brake-staff (so that the latter is free to revolve reversely) with the disengagement of the members of the said retaining mechanism, thus permitting the release of the brake, substantially as set forth.

5. In a brake-actuating mechanism, the combination of a brake-handle, a brake-staff, a bearing supporting the head of the brake-handle in which it may move pivotally and vertically, mechanism for connecting the head of the handle with the head of the brake-staff, a lower bearing for the brake-staff, a retaining mechanism for the brake-staff comprising an under ratchet secured to said staff and an upper ratchet slidably mounted thereon but fixed against rotation, a tube adapted to slide upon the staff and connecting said upper ratchet with the handle-head, means for automatically forcing into engagement the ratchets of the retaining mechanism, a fixed incline near the head of the handle, an inclined slide mounted in the handle, said inclined slide being adapted, upon a single inward movement of the handle, to ride up upon said fixed incline and thus effect the disengagement of the handle and staff and of the retaining mechanism, and the consequent release of the brakes, substantially as set forth.

6. In a brake-actuating mechanism, the combination of a brake-handle, a brake-staff, a bearing supporting the head of the brake-handle in which it may move pivotally and vertically, mechanism for connecting the head of the handle with the head of the brake-staff, a lower bearing for the brake-staff, a retaining mechanism for the brake-staff comprising an under ratchet secured to said staff and an upper ratchet slidably mounted thereon but fixed against rotation, a tube adapted to slide upon the staff and connecting said upper ratchet with the handle-head, means for automatically forcing into engagement the ratchets of the retaining mechanism, a fixed incline near the head of the handle, an inclined slide mounted in the handle and adapted to have longitudinal movement, said inclined slide being adapted, upon a single inward movement of the handle, to ride up upon said fixed incline and thus effect the disengagement of the handle and staff and of the retaining mechanism, and the consequent release of the brakes, substantially as set forth.

7. In a brake-actuating mechanism, the combination of a brake-handle, a brake-staff, means for connecting the handle and staff so that the former shall be operative to rotate the latter when moved in one direction and inoperative when moved in the reverse direction, means for retaining the brake-staff as it is rotated, means for connecting the brake-handle with the retaining mechanism, and means for disengaging the staff-rotating mechanism of the handle and the staff-retaining mechanism for the release of the brakes by one movement of the handle, substantially as set forth.

8. In a brake-actuating mechanism, the combination of a brake-handle, a brake-staff, means for connecting the handle and staff so that the former shall be operative to rotate the latter when moved in one direction and inoperative when moved in the reverse direction, means for retaining the brake-staff as it is rotated, means for connecting the brake-handle with the retaining mechanism, and means for disengaging the staff-rotating mechanism of the handle and the staff-retaining mechanism by a single inward thrust of the handle, whereby the brakes may be released, substantially as set forth.

9. In a brake-actuating mechanism, the combination of a brake-handle, a brake-staff, means for connecting the handle and staff so that the former shall be operative to rotate the latter when moved in one direction and inoperative when moved in the reverse direction, means for retaining the brake-staff as it is rotated, means for connecting the brake-handle with the retaining mechanism, and means for lifting the handle and a vertically-moving member of the retaining mechanism, by a single inward thrust of the handle, whereby the brakes may be released, substantially as set forth.

10. In a brake-actuating mechanism, the combination of a brake-handle, a brake-staff, means for connecting the handle and staff so that the former shall be operative to rotate the latter when moved in one direction and inoperative when moved in the reverse direction, means for retaining the brake-staff as it is rotated, means for connecting the brake-handle with the retaining mechanism, and means for locking the handle after the setting of the brakes, substantially as set forth.

11. In a brake-actuating mechanism, the combination of a brake-handle, a brake-staff, means for connecting the handle and staff so that the former shall be operative to rotate the latter when moved in one direction and inoperative when moved in the reverse direction, means for retaining the brake-staff as it is rotated, means for connecting the brake-handle with the retaining mechanism, means for locking the handle after the setting of the brakes, said means consisting of a device carried by the handle and operated by the hand of the manipulator and adapted to engage and thus lock with a fixed part of the handle-bearing, substantially as set forth.

In testimony whereof we hereunto set our hands and seals.

PLATO G. EMERY. [L. S.]
WILLIAM WISHART. [L. S.]

Witnesses:
HENRY O. MILLER,
CHAS. F. PIKE.